US009225591B2

(12) United States Patent
Beheshti-Zavareh et al.

(10) Patent No.: US 9,225,591 B2
(45) Date of Patent: **\*Dec. 29, 2015**

(54) CONTROLLER PLACEMENT FOR FAST FAILOVER IN THE SPLIT ARCHITECTURE

(71) Applicant: Telefonaktiebolaget L M Ericsson (publ), Stockholm (SE)

(72) Inventors: Neda Beheshti-Zavareh, San Jose, CA (US); Ying Zhang, Fremont, CA (US); Joel Halpern, Leesburg, VA (US)

(73) Assignee: Telefonaktiebolaget L M Ericsson (publ), Stockholm (SE)

( \* ) Notice: Subject to any disclaimer, the term of this patent is extended or adjusted under 35 U.S.C. 154(b) by 0 days.

This patent is subject to a terminal disclaimer.

(21) Appl. No.: 14/637,238

(22) Filed: Mar. 3, 2015

(65) Prior Publication Data

US 2015/0180705 A1 Jun. 25, 2015

Related U.S. Application Data

(63) Continuation of application No. 14/327,431, filed on Jul. 9, 2014, now Pat. No. 9,059,928, which is a continuation of application No. 13/402,732, filed on Feb. 22, 2012, now Pat. No. 8,811,212.

(51) Int. Cl.
*H04L 12/24* (2006.01)
*H04L 12/715* (2013.01)
*H04L 12/721* (2013.01)
(Continued)

(52) U.S. Cl.
CPC ........ *H04L 41/0663* (2013.01); *H04L 41/0836* (2013.01); *H04L 41/12* (2013.01); *H04L 41/145* (2013.01); *H04L 41/22* (2013.01); *H04L 45/12* (2013.01); *H04L 45/22* (2013.01);
(Continued)

(58) Field of Classification Search
CPC ..... H04L 45/64; H04L 45/22; H04L 41/0836; H04L 41/0663
See application file for complete search history.

(56) References Cited

U.S. PATENT DOCUMENTS 5,898,843 A 4/1999 Crump et al.
6,778,492 B2 8/2004 Charny et al.
(Continued)

FOREIGN PATENT DOCUMENTS

EP 2552065 1/2013
WO WO-2008/072127 A1 6/2008

OTHER PUBLICATIONS http://openflow.org/documents/openflow1.1-allmerged-draft.pdf.
(Continued)

*Primary Examiner* — Asad Nawaz
*Assistant Examiner* — Syed S Ali
(74) *Attorney, Agent, or Firm* — Nicholson De Vos Webster & Elliott, LLP (57) ABSTRACT

A method implemented by a network topology design system, the network topology design system including a processing device. The method to determine placement of a controller within a network with a split architecture where control plane components of the split architecture network are executed by a controller and the control plane components are separate from data plane components of the split architecture network. The placement of the controller is selected to minimize disruption of the split architecture network caused by a link failure, a switch failure or a connectivity loss between the controller and the data plane components.

16 Claims, 6 Drawing Sheets

(51) Int. Cl.
*H04L 12/707* (2013.01)
*H04L 12/703* (2013.01)
*H04W 16/18* (2009.01)
*H04L 12/753* (2013.01)

(52) U.S. Cl.
CPC .............. *H04L 45/28* (2013.01); *H04L 45/48* (2013.01); *H04L 45/64* (2013.01); *H04W 16/18* (2013.01)

(56) References Cited

U.S. PATENT DOCUMENTS

| | | |
|---|---|---|
| 6,865,609 B1 | 3/2005 | Gubbi et al. |
| 6,928,484 B1 | 8/2005 | Huai et al. |
| 7,366,113 B1 | 4/2008 | Chandra et al. |
| 7,366,989 B2 | 4/2008 | Naik et al. |
| 7,415,211 B2 | 8/2008 | Feinberg |
| 7,512,063 B2 | 3/2009 | Vasseur et al. |
| 7,545,735 B1 | 6/2009 | Shabtay et al. |
| 7,746,796 B2 | 6/2010 | Swallow et al. |
| 7,911,978 B1 | 3/2011 | Chandra et al. |
| 8,018,860 B1 | 9/2011 | Cook |
| 8,045,551 B2 | 10/2011 | Madrahalli et al. |
| 8,255,660 B1 | 8/2012 | Chatterjee et al. |
| 8,274,989 B1 | 9/2012 | Allan et al. |
| 8,311,014 B2 | 11/2012 | Valluri et al. |
| 8,351,456 B2 | 1/2013 | Kadous et al. |
| 8,364,515 B1 | 1/2013 | Procopiuc |
| 8,446,818 B2 | 5/2013 | Moisiadis et al. |
| 8,559,314 B2 | 10/2013 | Yedavalli et al. |
| 8,593,958 B2 | 11/2013 | Zhang |
| 8,804,490 B2 | 8/2014 | Tatipamula et al. |
| 8,811,212 B2 | 8/2014 | Beheshti-Zavareh et al. |
| 2002/0042274 A1 | 4/2002 | Ades |
| 2002/0067693 A1 | 6/2002 | Kodialam et al. |
| 2002/0187770 A1 | 12/2002 | Grover et al. |
| 2003/0005149 A1 | 1/2003 | Haas et al. |
| 2003/0009598 A1 | 1/2003 | Gunluk et al. |
| 2003/0174644 A1* | 9/2003 | Yagyu ................. H04L 41/0663 370/228 |
| 2003/0193898 A1 | 10/2003 | Wong et al. |
| 2003/0218989 A1 | 11/2003 | El-Amawy et al. |
| 2004/0133663 A1* | 7/2004 | Grover ............... H04L 41/0663 709/220 |
| 2004/0179471 A1 | 9/2004 | Mekkittikul et al. |
| 2004/0205238 A1* | 10/2004 | Doshi ................ H04L 41/0663 709/241 |
| 2004/0218582 A1 | 11/2004 | Kennedy et al. |
| 2005/0031339 A1* | 2/2005 | Qiao .................. H04L 41/0896 398/4 |
| 2005/0060319 A1 | 3/2005 | Douglas et al. |
| 2005/0083844 A1 | 4/2005 | Zhu et al. |
| 2005/0243711 A1 | 11/2005 | Alicherry et al. |
| 2006/0092935 A1 | 5/2006 | Lakshman et al. |
| 2006/0104199 A1 | 5/2006 | Katukam et al. |
| 2006/0126654 A1 | 6/2006 | Nilakantan et al. |
| 2006/0153067 A1 | 7/2006 | Vasseur et al. |
| 2006/0215666 A1 | 9/2006 | Shepherd et al. |
| 2006/0291473 A1 | 12/2006 | Chase et al. |
| 2007/0070909 A1 | 3/2007 | Reeve |
| 2007/0086332 A1 | 4/2007 | Way et al. |
| 2007/0206492 A1 | 9/2007 | Zelig et al. |
| 2007/0286218 A1 | 12/2007 | Zhang et al. |
| 2008/0049621 A1 | 2/2008 | McGuire et al. |
| 2008/0304428 A1 | 12/2008 | Stilling et al. |
| 2009/0003211 A1* | 1/2009 | Akyamac ........... H04J 14/0284 370/235 |
| 2009/0013091 A1 | 1/2009 | Zhang et al. |
| 2009/0135717 A1* | 5/2009 | Kamal ................. H04J 3/14 370/225 |
| 2009/0168768 A1 | 7/2009 | Chiabaut et al. |
| 2009/0276666 A1 | 11/2009 | Haley et al. |
| 2010/0142370 A1 | 6/2010 | Pan et al. |
| 2010/0157794 A1 | 6/2010 | Nakash |
| 2010/0165886 A1 | 7/2010 | Borril |
| 2010/0290396 A1 | 11/2010 | Karunakaran et al. |
| 2010/0332991 A1 | 12/2010 | Banerjee et al. |
| 2011/0069686 A1 | 3/2011 | Raman |
| 2011/0274035 A1 | 11/2011 | Yadav et al. |
| 2011/0274037 A1 | 11/2011 | Jain et al. |
| 2011/0280213 A1 | 11/2011 | Calhoun et al. |
| 2011/0280568 A1 | 11/2011 | Dvir et al. |
| 2011/0286396 A1 | 11/2011 | Kato et al. |
| 2011/0289137 A1 | 11/2011 | Ittah et al. |
| 2012/0096085 A1 | 4/2012 | Yoon et al. |
| 2012/0110393 A1 | 5/2012 | Shieh et al. |
| 2012/0195319 A1 | 8/2012 | Bragg et al. |
| 2012/0224588 A1 | 9/2012 | Germain et al. |
| 2012/0230199 A1 | 9/2012 | Chiabaut |
| 2012/0250695 A1 | 10/2012 | Jia et al. |
| 2012/0263185 A1 | 10/2012 | Bejerano et al. |
| 2012/0303835 A1 | 11/2012 | Kempf et al. |
| 2012/0317058 A1 | 12/2012 | Abhulimen |
| 2013/0028070 A1 | 1/2013 | Beheshti-Zavareh et al. |
| 2013/0028073 A1 | 1/2013 | Tatipamula et al. |
| 2013/0028142 A1* | 1/2013 | Beheshti-Zavareh ... H04L 45/22 370/255 |
| 2013/0176859 A1 | 7/2013 | Stanislaus et al. |
| 2013/0182608 A1 | 7/2013 | Maggiari et al. |
| 2013/0215769 A1 | 8/2013 | Beheshti-Zavareh et al. |
| 2013/0223225 A1* | 8/2013 | Hui ........................ H04L 12/10 370/236 |
| 2013/0259465 A1 | 10/2013 | Blair |
| 2013/0346545 A1 | 12/2013 | Petersen et al. |
| 2014/0016477 A1 | 1/2014 | Yedavalli et al. |
| 2014/0258485 A1 | 9/2014 | Yang et al. |
| 2014/0321330 A1 | 10/2014 | Beheshti-Zavareh et al. |

OTHER PUBLICATIONS

Non-Final Office Action, U.S. Appl. No. 13/236,296, dated Nov. 6, 2013, 17 pages.
Non-Final Office Action, U.S. Appl. No. 13/402,732, dated Dec. 4, 2013, 20 pages.
Notice of Allowance, U.S. Appl. No. 13/402,732, dated Apr. 11, 2014, 19 pages.
Non-Final Office Action, U.S. Appl. No. 13/294,559, dated May 29, 2014, 10 pages.
Notice of Allowance, U.S. Appl. No. 13/236,296, dated Jun. 20, 2014, 18 pages.
Notice of Allowance, U.S. Appl. No. 14/327,431, dated Feb. 13, 2015, 20 pages.
Beheshti, Neda, "Fast Failover for Control Traffic in Software-defined Networks", *Global Communications Conference, 2012 IEEE*; Dec. 3, 2012; pp. 2665-2670.
Kin-Wah, et al., "On the Feasibility and Efficacy of Protection Routing in IP Networks", *University of Pennsylvania Technical Report*, Jul. 2009.
McKeown, et al., "Openflow: enabling innovation in campus networks", Mar. 2008.
McKeown, Nick, et al., "OpenFlow: Enabling Innovation in Campus Networks", Mar. 14, 2008; pp. 1-6; retrieved from Internet: URL: http://www.openflow.org/documents/openflow-wp-latest.pdf.
Zhang, Ying, et al., "On Resilience of Split-Architecture Networks", *Global Telecommunications Conference, 2011, IEEE*, Dec. 5, 2011, pp. 1-6.
RFC 2328: J. Moy, "OSPF Version 2," Apr. 1998, 244 pages, Network Working Group, Request for Comments: 2328, The Internet Society.
Silber, et al. "Augmenting overlay trees for failure resiliency," Global Telecommunications Conference, GLOBECOM '04, IEEE, vol. 3, Nov. 29, 2004, pp. 1525-1531.

* cited by examiner

CONTROLLER PLACEMENT FOR FAST FAILOVER IN THE SPLIT ARCHITECTURE

CROSS-REFERENCE TO RELATED APPLICATIONS

The present application is a continuation of U.S. patent application Ser. No. 14/327,431 filed Jul. 9, 2014 (issued as U.S. Pat. No. 9,059,928), which is a continuation of U.S. patent application Ser. No. 13/402,732 filed Feb. 22, 2012 (issued as U.S. Pat. No. 8,811,212 on Aug. 19, 2014), which was related to U.S. patent application Ser. No. 13/236,296 filed Sep. 19, 2011 (issued as U.S. Pat. No. 8,804,490 on Aug. 12, 2014).

FIELD OF THE INVENTION

The embodiments of the invention are related to the organization and design of networks. Specifically, the embodiments of the invention relate to a method and system for determining placement of controllers for switches in a split architecture network with control de-coupled from forwarding.

BACKGROUND

A split-architecture network design introduces a separation between the control and forwarding components of a network. Among the use cases of such architecture are the access/aggregation domain of carrier-grade networks, mobile backhaul, cloud computing, and multilayer (L3 & L2 & L1, OTN, WDM) support, data centers, all of which are among the main building blocks of a network architecture. Therefore, proper design, management and performance optimization of these networks are of great importance.

Unlike the traditional network architecture, which integrates both the forwarding (data) and the control planes in the same box (network element), a split architecture network decouples these two planes and executes the control plane on servers that might be in different physical locations from the forwarding elements (switches). The use of a split architecture in a network enables the simplification of the switches implementing the forwarding plane and shifts the intelligence of the network into a number of controllers that oversee the switches.

The tight coupling of the forwarding and control planes in a traditional architecture usually results in an overly complicated control plane and complex network management. This is known to create a large burden and high barrier to new protocols and technology developments. Despite the rapid improvement of line speeds, port densities, and performance, the network control plane mechanisms have advanced at a much slower pace than the forwarding plane mechanisms.

Figure 1:
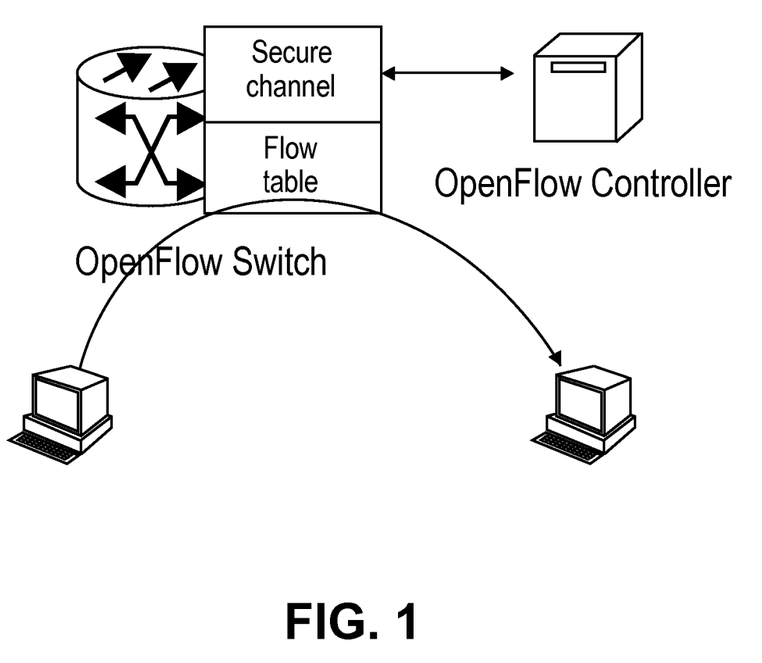
FIG. 1 is a diagram of one embodiment of an example architecture for a OpenFlow network.

In a split architecture network, controllers collect information from switches, and compute and distribute the appropriate forwarding decisions to switches. Controllers and switches use a protocol to communicate and exchange information. An example of such protocol is OpenFlow (see www.openflow.org), which provides an open and standard method for a switch to communicate with a controller, and it has drawn significant interest from both academics and industry. FIG. 1 is a diagram showing an overview of the OpenFlow interface between a switch and a controller. The forwarding table in an OpenFlow switch is populated with entries consisting of: a rule defining matches for fields in packet headers; an action associated to the flow match; and a collection of statistics on the flow.

When an incoming packet matches a particular rule, the associated actions are performed on the packet. A rule contains key fields from several headers in the protocol stack, for example Ethernet MAC addresses, IP address, IP protocol, TCP/UDP port numbers as well as the incoming port number. To define a flow, all the available matching fields may be used. But it is also possible to restrict the matching rule to a subset of the available fields by using wildcards for the unwanted fields.

The de-coupled control platform of the split architecture eases the task of modifying the network control logic and provides a programmatic interface upon which developers can build a wide variety of new protocols and management applications. In this model, the data and control planes can evolve and scale independently, while the cost of the data plane elements is reduced.

SUMMARY

The embodiments of the invention include a method implemented by a network topology design system, where the network topology design system includes a processing device. The method determines placement of a controller within a network with a split architecture where control plane components of the split architecture network are executed by a controller and the control plane components are separate from data plane components of the split architecture network. The placement of the controller is selected to minimize disruption of the split architecture network caused by a link failure, a switch failure or a connectivity loss between the controller and the data plane components. The method includes graphing a topology of the split architecture network, with links in the split architecture network represented as a set of edges in a graph and network elements in the split architecture network represented as a set of nodes. The methods also include traversing the set of nodes within the graph to calculate a protection metric for each node, wherein the protection metric measures resilience of the split architecture network as a degree of node failure protection within the split architecture network for a potential controller placement, the degree of node failure protection determining a subset of protected nodes in the set of nodes, where a protected node in the subset of protected nodes can redirect control traffic over a tunnel to an intermediate node in the graph that is not downstream of the protected node, and where the tunnel traverses at least one downstream node of the protected node. Further, the method includes selecting the network element corresponding to the node which will result in a best overall protection strategy for the network to be the controller for the split architecture network.

The embodiments include a network with a split architecture where control plane components of the split architecture network are executed by a controller and the control plane components are separate from data plane components of the split architecture network. The placement of the controller is selected to minimize disruption of the split architecture network caused by a link failure, a switch failure or a connectivity loss between the controller and the data plane components. The network comprises a set of network elements interconnected by a set of communication links, each network element in the set of network elements executes a switch that is controlled by and in communication with the controller. The controller is executed by one of the set of network elements, wherein a position of the network element in the set of network elements within the split architecture network provides an optimized number of protected nodes between the controller and each of the network elements in the set of network elements. The optimized location corresponds to a best protection strategy for all the network elements in the set of network elements. The protection metric measures resilience of the split architecture network as a degree of node failure protection within the split architecture network, the degree of node failure protection determining a subset of protected network elements in the set of network elements, where a protected network element in the subset of protected network elements can redirect control traffic over a tunnel to an intermediate network element in the graph that is not downstream of the protected network element, and where the tunnel traverses at least one downstream network element of the protected network element.

The embodiments include a computer system for determining a placement of a controller for a split architecture network where control plane components of the split architecture network are executed by the controller and the control plane components are separate from data plane components of the split architecture network. The placement of the controller is selected to minimize disruption of the split architecture network caused by a link failure, a switch failure or a connectivity loss between the controller and the data plane components. The computer system comprises a processor configured to execute a topology graphing module and controller placement module, the topology graphing module configured to graph a topology of the split architecture network, with links in the split architecture network represented as a set of edges in a graph and network elements in the split architecture network represented as a set of nodes. The controller placement module is configured to traverse the set of nodes within the graph to calculate a protection metric for each node. The protection metric measures resilience of the split architecture network as a degree of node failure protection within the split architecture network for a potential controller placement, the degree of node failure protection determining a subset of protected nodes in the set of nodes, where a protected node in the subset of protected nodes can redirect control traffic over a tunnel to an intermediate node in the graph that is not downstream of the protected node, and where the tunnel traverses at least one downstream node of the protected node. The controller placement module further is configured to select the network element corresponding to the node with a best protection metric to be the controller for the split architecture network.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flowcharts will be described with reference to the exemplary embodiments of diagrams. However, it should be understood that the operations of the flowcharts can be performed by embodiments of the invention other than those discussed with reference to the diagrams, and the embodiments discussed with reference to diagrams can perform operations different than those discussed with reference to the flowcharts.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection). The embodiments described herein use the example of network element in the form of a switch. However, the embodiments are not limited to switches and are applicable to other types of network elements.

As used herein resilience is the ability to provide and maintain an acceptable level of service in the face of faults and challenges to normal operation. As used herein failure probability is the frequency with which an engineered system or component fails, expressed as the number of failures per hour, or the probability that each node fails over the long term.

In evaluating a network design, network resilience is an important factor, as a failure of a few milliseconds may easily result in terabyte data losses on high-speed links. In traditional networks, where both control and data packets are transmitted on the same link, the control and data information are equally affected when a failure happens. The existing work on the network resilience has therefore assumed an in-band control model, meaning that the control plane and data plane have the same resilience properties. However, this model is not applicable to split-architecture networks.

A link failure indicates that traffic traversing a link can no longer be transferred over the link. The failure can be either of a link between two switches or of a link between one controller and the switch to which it connects. In most cases, these links fail independently.

A switch failure indicates that the corresponding network element is unable to originate, respond, or forward any packet. Switch failures can be caused by software bugs, hardware failures, misconfigurations, and similar issues. In most cases, these switches fail independently.

Special cases of failure include connectivity loss between a switch and a controller. A switch can lose connectivity to its controller due to failures on the intermediate links or nodes along the path between the switch and the controller. In one embodiment, whenever a switch cannot communicate with its assigned controller, the switch will discard all the packets on the forwarding plane managed by the controller, even though the path on the forwarding plane is still valid. In other embodiments, a subset of the traffic can be forwarded on forwarding plane or similar limited functionality can continue for a limited amount of time until a connection with an assigned controller or another controller is re-established. Therefore, this can be considered as a special case of switch failure.

The control packets in split-architecture networks can be transmitted on different paths from the data packet (or even on a separate network). Therefore, the reliability of the control plane in these networks is no longer directly linked with that of the forwarding plane. However, disconnection between the controller and the forwarding plane in the split architecture could disable the forwarding plane; when a switch is disconnected from its controller, it cannot receive any instructions on how to forward new flows, and becomes practically offline.

In one embodiment of a split-architecture network, each switch is pre-programmed with a path to reach the controller. Upon a link or node failure, the switch relies on the controller to detect such failure and recompute the new path for the switch. However, handling of all failures by the controller could result in large delays in the network. In another embodiment, pre-configuration of a backup path and/or a tunneling to an intermediate switch is used to re-establish communicaiton with a controller, so that if the primary output link does not work properly, the backup (secondary) output link or an encapsulation of controll traffic through a tunnel to an intermediate switch could be used.

When a switch detects a failure in its outgoing link or its immediate upstream node, it immediately changes its route to the controller, and uses the backup path, i.e., outgoing interface, pre-programmed in the switch to reconnect to the controller. In the alternate, the switch detects the failure and encapsulates the control traffic for transmission over a tunnel to an intermediate switch that decapsulates the control traffic and forwards the control traffic to the controller. This takes place without a need to involve the controller and without any effects on the rest of the routes in the network and on the connections of the downstream nodes to the controller. In other words, there will only be a local change in the outgoing interface of the affected switch. All other connections in the network will remain intact. Without such backup paths or encapsulation options, detecting of any failures in switches or links by the controller must be based on some implicit mechanisms, such as when Hello messages are not received by the controller from a switch. This introduces large delays in the network for detecting the exact location of the failure and re-establishing the controller-switch connections. If no backup path or tunneling option can be configured for a switch, then the connection of the switch to the controller will be interrupted in case of a failure in the primary path to the controller.

As used herein, a switch is considered to be protected (in its connection to the controller) against the failure of its immediate upstream switch and its outgoing link' if either of the following conditions holds: i) the switch can use a backup outgoing link for its control traffic towards the controller, or ii) the switch can send its control traffic over a tunnel to another (intermediate) switch and from there to the controller.

When a failure happens in the outgoing link or immediate upstream node of a protected switch, the switch can either use the backup outgoing link (if condition i holds) to reconnect to the controller. In the alternative (if condition ii holds), the switch can encapsulate the control message inside a data message and send it to another (intermediate) switch. When the intermediate switch receives this message, it will de-capsulate the message and send it, like its own control traffic, to the controller.

If none of the above two conditions are satisfied, then in case of a failure in the outgoing link or the immediate upstream switch, the connection between the switch and the controller will be interrupted. The goal is to minimize the chance of such interruption. The most resilient scenario is, clearly, when every switch in the network is protected. But if that is not the case, then some optimization is required to minimize the risk of control-traffic interruption.

Using this protection scheme in a split architecture network, it is important to place the controller such that the connection between the control plane and the forwarding plane is less likely to be interrupted. A good selection of the controller location must result in reliable paths from the switches to the controller, in the sense that a large number of switches must have backup paths to the controller.

The embodiments of the invention provide a method and system for avoiding the disadvantages of the prior art. Existing proposals on split-architecture network design assume fixed locations for the network controllers. While there has been some research on the routing mechanisms between network controllers and switches, strategies for choosing optimized location for the network controller have not been developed. As a result, controller placement in split architectures does not take into account the possibility of disconnection between a controller and the forwarding plane and seek to minimize this possibility.

Further, schemes for split-architecture networks with multiple controllers are focused on partitioning the network and assigning one controller to each partition in such a way that switches inside each partition are well connected. This does not address finding an optimal location for a controller in a given network without partitioning. Schemes for placing a single controller in a split-architecture network may place the controller at a node that maximizes the resiliency of the connection between the controller and the switches, however, these schemes are based on a restricted definition of protection. In such schemes a protected switch is a switch with a backup outgoing link and does not consider the possibility of sending the control traffic over a tunnel to another switch and from there to the controller.

The embodiments of the invention overcome these disadvantages of the the prior art. The embodiments of the invention place a single controller in a split architecture area, in a location selected to optimize the connection resilience between the controller and the switches in that area. No assumptions on how the partitioning of the split-architecture areas are made. The partitioning, if any, can be based on any arbitrary metrics such as geographical constraints. The embodiments of the invention encompass two example processes (i.e., an optimal process and a greedy process) for choosing the controller location to optimize the connection resilience between the controller and the switches, i.e., to maximize the number of switches with pre-configured backup paths to the controller through either direct backup links or through tunneling control traffic to an intermediate network element that is not downstream from the point of failure.

The embodiments support a more general definition for a protected switch. If there is no backup outgoing interface for a switch, the switch is still considered to be protected if it can send its control traffic to another (intermediate) switch and from there to the controller. In this case, the switch encapsulates the control message inside a data message to the intermediate switch. When the intermediate switch receives this message, it will de-capsulate the message and send it (like its own control traffic) to the controller. This alternate protection mechanism is referred to herein as tunneling-based protection, and the term tunneling is to refer to the process of encapsulating the traffic message inside a data message, sending it to the intermediate switch, and finally de-capsulating it at the intermediate switch. Using this more general definition of protection, the embodiments include processes and systems to optimally place the controller in the network such that the resiliency is maximized.

Network Controller Location

The resiliency of the connection between the control plane and the forwarding plane is of great importance in split-architecture networks. If this connection is interrupted, then the forwarding plane will not know how to forward new flows (i.e., those flows with no existing rules in switches) and will lose its forwarding functionality. The embodiments of the invention provide a process to decide where to place the split-architecture controller, such that this connection (between the control plane and the forwarding plane) is less likely to be interrupted. Given a network topology, the process seeks to choose the right node in the network to locate the controller at that node. A good selection of a network's controller location must result in reliable paths from the switches to the controller, in the sense that each switch must have a backup (secondary) path to the controller or tunneling based protection which won't be affected by the same failure, in case its primary path fails this backup path can be either a direct link between the switch detecting the failure and another switch in the network that remains in communication with the controller or tunneling-based protection in the form of an indirect link between the switch detecting the failure and an intermediate switch over a tunnel where the tunnel traverses at least one downstream switch.

Protection Metric

In order to evaluate different controller placement strategies in a network (and to develop a policy for choosing a good location), a protection metric is utilized, which is based on node protection. This metric is applied to the split architecture to assess the network's resiliency against link failures, as defined above and further explained herein below.

Transient failures happen relatively frequently even in well-managed Internet Protocol (IP) networks. However, the network service is expected to be always available with the increasing demand on delivering critical services. With the high requirements on network reliability, the embodiments of the invention seek to improve the resilience of the connectivity between the controller and the switches in a split architecture network.

Network Environment

The embodiments of the invention provide a process where the forwarding of data packets resumes after a failure as soon as possible. The existing interior gateway protocols (IGPs) such as open shortest path first (OSPF) and intermediate system to intermediate system (IS-IS) typically take several seconds to converge, which does not meet a sub-50 ms level of failure recovery time, which is expected for network reliability. The controller could detect the failures in switches or links using some implicit mechanisms, e.g., when hello messages are not received by the controller from a switch. However, this method will also introduce a large delay in the network for failure detection and service restoration.

In one embodiment, the decision of protection switching is made locally and pre-determined by the controller (i.e. at the network element detecting the failure). This is different from the scenario in a traditional network, because the network element does not have a complete topology of the network. The network element is only a simple switch in the forwarding plane and only receives forwarding rules from the controller. When losing the connectivity to the controller, the switch has to make the decision of failover independently without any instructions from the controller. In other words, there will only be a local change in the outgoing interface of the affected switch. All other connections in the network will remain intact. In this manner the process keeps the forwarding element, i.e., the switch, as simple as possible.

In one embodiment, the controller is in the same physical network as the switches. That is, the existing infrastructure of the split architecture network (existing links and switches) is used to connect the controller to all the switches in the network, as opposed to using a separate infrastructure to connect the control and forwarding planes. In other embodiments, a separate network infrastructure is used for communication or any combination thereof.

As used herein, a network of switches is denoted by a graph $G=(V, E)$, where V is the set of nodes (switches and the controller) in the network and E is the set of bidirectional edges (links) between nodes. A cost is associated with each link in the network. Based on assigned link costs, shortest-path routes are calculated between any two nodes in the network. It is assumed that the cost on each link applies to both directions of the link. It is also assumed that there is no load balancing on the control traffic sent between the switches and the controller. Therefore, each node has only one path to reach the controller. In other words, the control traffic is sent from and to the controller over a tree, rooted at the controller, which will be referred to herein as a controller routing tree. This routing tree covers all the nodes in the network and a subset of the edges. The same routing tree is used for communications between the controller and the switches in both directions.

Figure 2A:
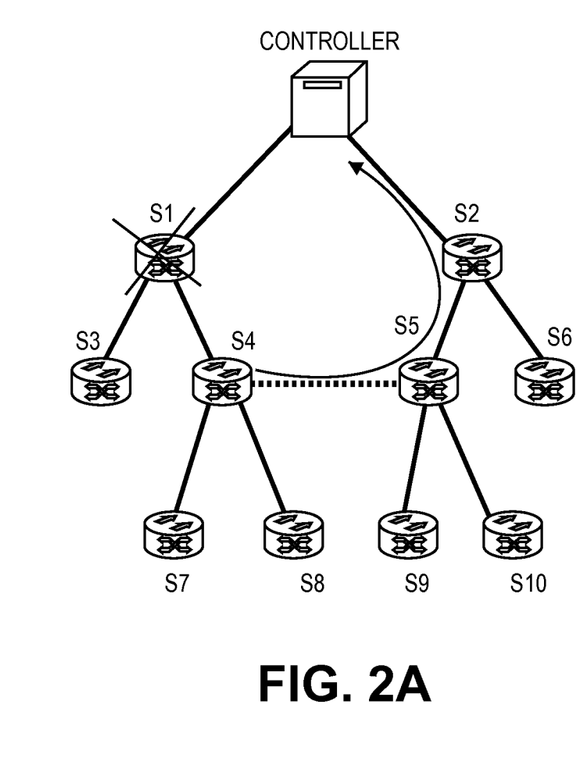
FIGS. 2A and 2B are diagrams of one embodiment of a split architecture network that contains both protected and unprotected switches, each Figure illustrates a separate protection mechanism.
Figure 2B:
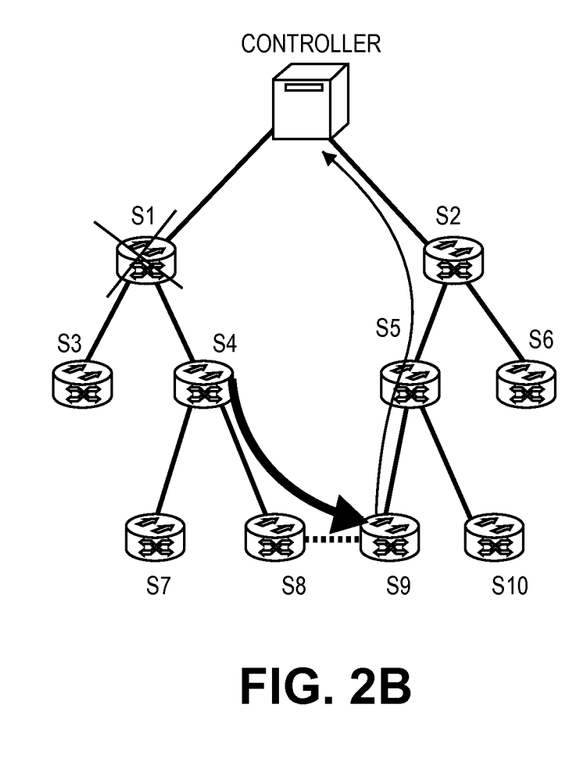

With a given controller location, any shortest-path routing protocol forms a tree T, rooted at the controller node, which covers all the nodes and a subset of the edges. As mentioned above, this tree is referred to as the controller routing tree. FIGS. 2A and 2B show a network and its controller routing tree. In these figures, the dashed lines show all links in the network, and the solid lines show the links used in the controller routing tree. Each node can reach the controller by sending its control traffic along the paths in the controller routing tree. In these examples, both directions of each link have the same cost, and therefore, the same routing tree will be used for communications between the controller and the switches in both directions.

In the controller routing tree T, node u is an upstream node of node v if there is a path in T from node v to node u towards the controller. Node u is called a downstream node of node v if there is a path in T from node u to node v towards the controller. In the example networks depicted in FIGS. 2A and 2B, for example, node S4 is an upstream node of nodes S7 and S8, and these two nodes are downstream nodes of node S4. In the controller routing tree, a node's parent is its immediate upstream node and a node's children are its immediate downstream nodes. Because of the assumed tree structure, each node has only one immediate upstream node in T. In the example and in the embodiments of the controller placement process, it is assumed that there is no load balancing on the control traffic sent from the switches to the controller. That is, we assume each node in the network has only one immediate upstream node in T. The symbols introduced herein (e.g., G, T, u and v) are used herein below to represent these concepts for sake of clarity and accuracy.

Node and Link Failures

As discussed herein above, a switch is considered to be protected (in its connection to the controller) against the failure of its immediate upstream switch and its outgoing link if the switch can either:

i) Use a backup outgoing link for its control traffic towards the controller; or ii) Send its control traffic over a tunnel to another (intermediate) switch and from there to the controller.

For example, a protected switch that detects a failure in its outgoing link or its immediate upstream node will if condition (i) holds, as soon as the failure is detected, immediately change its route to the controller and use the backup outgoing link to reconnect to the controller. If condition (ii) holds, then the switch can encapsulate the control message inside a data message to the intermediate switch. When the intermediate switch receives this message, it will de-capsulate the message and send it (like its own control traffic) to the controller. In both cases, the re-routing of the control traffic takes place without any impacts on the rest of on the connections of other switches to the controller. In other words, there will only be a local change in the outgoing interface of the affected switch. All other connections in the network will remain intact. In one embodiment, the switch can carry out either of these failover processes (i.e., those tied to condition (i) or (ii)) automatically without the participation of the controller.

If neither of these two conditions are satisfied, then in case of a failure in the primary path to the controller, the connection between the switch and the controller will be interrupted. The controller placement process and system described herein is designed to minimize the chance of such interruption. The most resilient configuration of the network is, clearly, when each and every switch in the network is protected. But if that configuration is not possible, then some optimization of the controller placement is required to minimize the risk of control traffic interruption between the controller and the switches in the network.

For those switches that are directly connected to the controller, upstream node protection is not defined or quantified, because the immediate upstream node is the controller. In split-architecture networks where the traditional failure management tools are deployed there is no extended signaling mechanism for a node to inform its downstream nodes of a failure. Therefore, if a switch is disconnected from the controller, then all its downstream nodes will also be disconnected, even if they are themselves protected against their outgoing links or immediate upstream nodes failures. This means that in evaluating networks resiliency, more importance should be assigned to nodes closer to the controller (which is the root of the controller routing tree). To represent these facets of the network that affect the resilience of the network, weights are defined for each node which are based on the number of its downstream nodes.

A weight of a routing tree can be defined to be the sum of the weights of all its unprotected nodes. This weight can be used to measure 'unprotectability' or resilience of the network for an associated controller position. For a given routing tree T, this routing tree weight can be described or represented by 'weight(T),' which should be minimized in order to maximize the resiliency of the network.

FIGS. 2A and 2B shows an example networks and two failure scenarios. The solid lines between the switches and controller in these figures show the shortest-path tree between the controller and the switches. If there are no failures in the network, the control traffic will be sent to/from the controller on this tree represented by the solid lines.

For example, switch S4 in this network is connected to the controller through its upstream parent S1. In both scenarios shown in FIGS. 2A and 2B, switch S4 is protected. This is because in case of failure in the immediate upstream switch S1 or the link connecting S4 and S1, there is still a backup path for the control traffic of switch S1 to reach the controller. In the case illustrated in FIG. 2A, there is a link between S4 and S5 represented by the dotted line. This link is not part of the routing tree, so this link can be configured in switch S4 as a backup outgoing link for the control traffic. Therefore, if S4 detects a failure in the primary outgoing link between switches S4 and S1 or at the upstream switch S1, then switch S4 can use the backup outgoing link between switches S4 and S5.

In the case illustrated in FIG. 2B, there is no link connecting S4 to another switch that can be used as a backup link. It should be noted that none of the links connecting S4 to its children (switches S6 and S8) can be used as a backup outgoing link for the control traffic, because they do not have a path in the routing tree to the controller that does not pass through the failed link or failed switch (i.e., link between switches S4 and S1 or the switch S1). In this case however, there is a link between switches S8 and S9. Here, switch S4 can make a tunnel from switch S8 to switch S9 (by encapsulating the control traffic with switch S9 as the destination). When switch S9 receives and de-capsulates this traffic, it can send the traffic to the controller (like its own control traffic) on the path S9-S5-S2-Controller. It should be noted that this path does not pass through S4 and S1, thereby avoiding the failed link or switch in this example. In other words, an intermediate switch has been selected by the controller whose path to the controller is not affected by the failure of switch S1 or the link between switches S4 and S1.

Evaluating the Protection Status of a Switch

In one embodiment, each switch S in a split-architecture network can have its protection status evaluated. As used herein 'parent(S)' denotes the immediate upstream switch of switch S, and 'downstream(S)' denote all the downstream switches of switch S (that is, its children and children of children and so on). Each switch S in a given network is protected according to our definition above if and only if there exists switches A and B in the network such that using standard set theory notation:
 1. A is in {S} ∪ downstream(S)—i.e., A is either S or one of Switch S's downstream nodes.
 2. B is not in downstream(parent(S))
 3. There is a link between A and B, which is not a part of the controller routing tree If the above three conditions hold, then in case of failure, switch S can send its control traffic over a tunnel to switch B and from there to the controller. If switch A happens to be S itself, then switch S can use link S-B as a backup outgoing link for the control traffic; hence, there is no need for tunneling in this special case. The above conditions basically guarantee that the control traffic could be sent over a sub-tree other than the one rooted at the parent of node S. That is, the traffic could bypass the failed switch/link Since the controller routing tree is a shortest-path tree, the three conditions above also guarantee that the path from switch B to the controller does not pass through S and its immediate upstream node (parent). Therefore path S-B-controller could be used when switch S detects a failure (either in its immediate upstream node or in the link connecting S to its immediate upstream node).

Returning the examples of FIGS. 2A and 2B, the switches A=S4 and B=S5 in FIG. 2A satisfy all the above three conditions, and in FIG. 2B, switches A=S8 and B=S9 satisfy these conditions.

Implementation of Protection Using OpenFlow

In one emodiment, the controller placement process can be applied to any implementation of a split architecture network. The forwarding table in an OpenFlow switch, for example, is populated with entries consisting of a rule defining matches for fields in packet headers, a set of actions associated with the flow match, and a collection of statistics on the flow. The OpenFlow specification version 1.1 introduces a method for allowing a single flow-match trigger forwarding on more than one of the ports of the switch. Fast failover is one of such methods. Using this method, the switch executes the first live action set. Each action set is associated with a special port that controls its liveness. OpenFlow's fast failover method enables the switch to change forwarding without requiring a round trip to the controller.

Controller Placement Process

The protection of nodes in a network depends on both the selection of the primary paths (for a given controller location) and the choice of the controller location. As set for below, a general routing policy is defined, which, for each choice of the controller location, selects the primary paths in the network for reaching the controller. This selection could be based on any desired metrics, e.g., performance metrics like delay or load. Also discussed are what a thorough search includes to find the best location for this arbitrarily selected primary paths.

Figure 3:
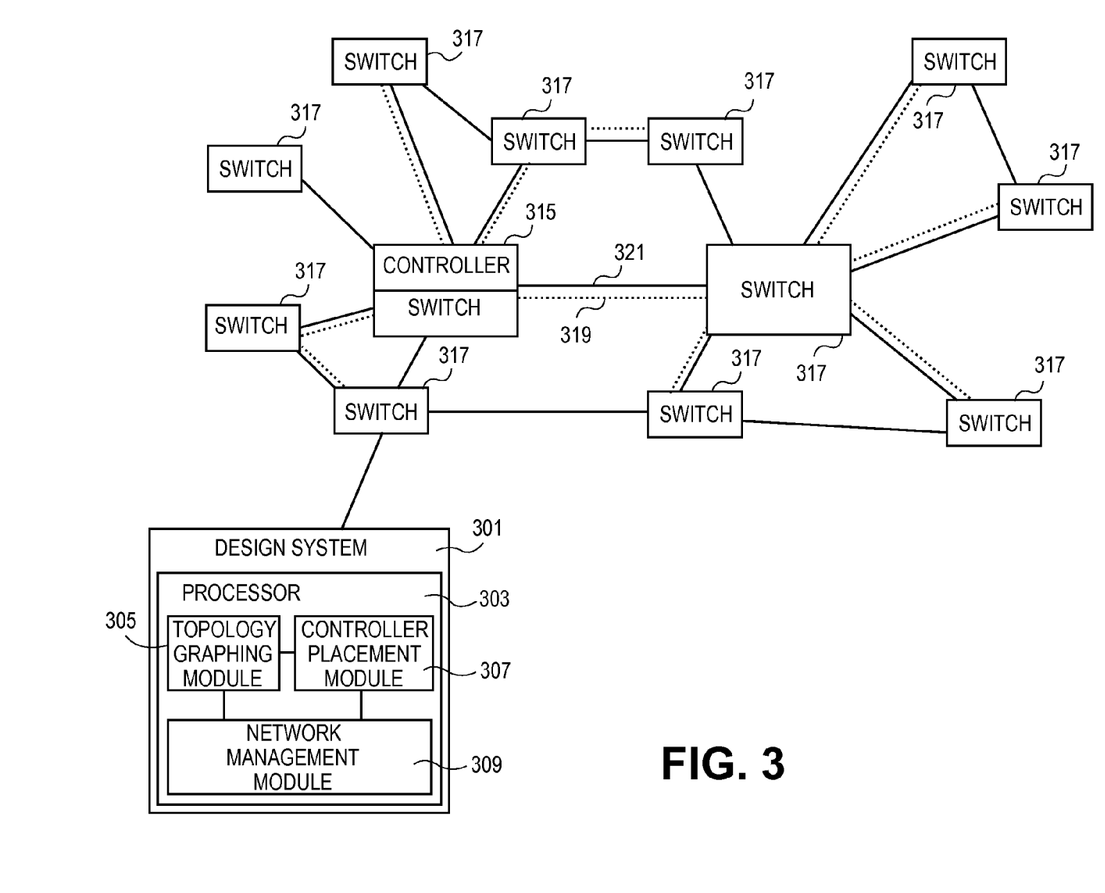
FIG. 3 is a diagram of one embodiment of a design system coupled to a network with optimized controller placement

Design System Architecture and Example Network with Optimized Controller Location FIG. 3 is a diagram of one embodiment of a design system coupled to a network with an optimized controller placement. The diagram provides an illustration of an example network design system 301 to execute the network design system tool.

The network design system 301 can be any type of computing device including a desktop computer, a server, a handheld computing device, a console device, a laptop device or similar computing device. The network design system 301 includes a set of processors 303 to run the components of the network design system tool including a topology graphing module 305, a controller placement module 307 and similar components. In other embodiments, any or all of these modules can be implemented as a set of hardware modules or devices. The processor 303 can also execute a network management module 309 to communicate with and/or manage the split architecture network.

The topology graphing module 305 can convert a network topology into a representative graph and perform graphing functions on the representative graph to support the controller placement module 307. The controller placement module 307 operates on the graph generated by the topology graphing module 305 and directs graphing operations to implement an optimal placement process or a 'greedy' placement process to determine a location for a controller as described further herein below.

The network management module 309 can communicate with the controller placement module 307 and/or the topology graphing module 305 to discover the network topology for an automated process and/or to implement controller placement in an automated process. In other embodiments, the controller placement module 307 generates a report or similar output to a user for implementing a network organization and the network management module 309 can be omitted.

The illustrated split architecture network is an example implementation with example controller placement consistent with the controller placement optimization. In the example, there is a controller 315 to control domain or split architecture area consisting of switches 317. The switches 317 are managed by the controller 315 using the controller routing tree 319 shown as dotted lines connecting the switches 317, where the solid lines 321 are the links between the switches 317. The process for determining the controller 315 location is described herein below.

Optimized Controller Location for Fast Failover

Figure 4:
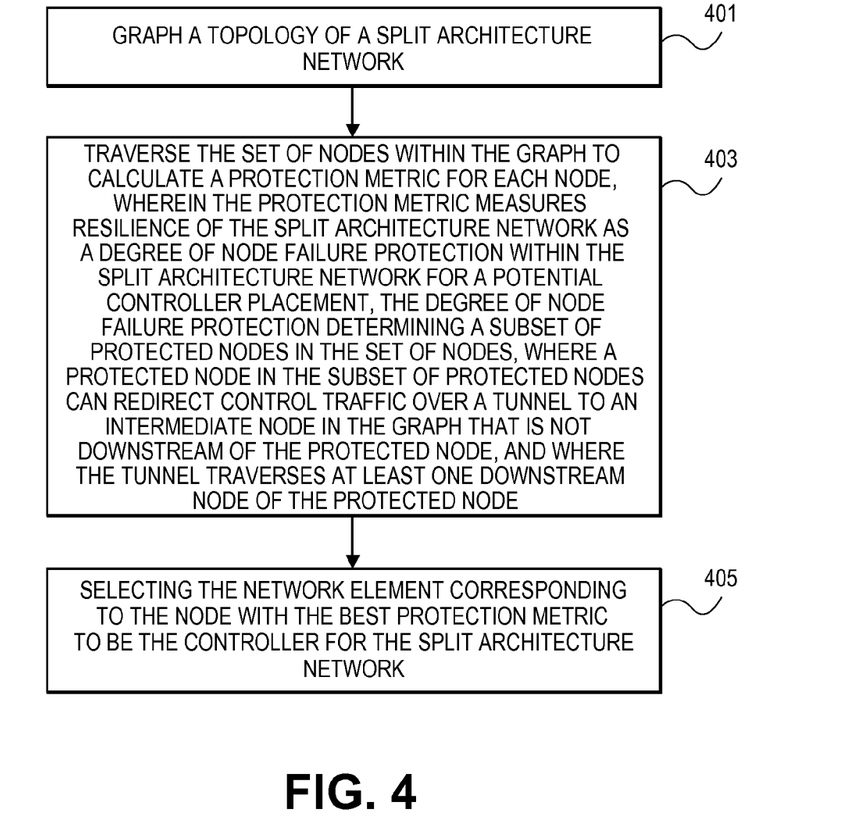
FIG. 4 is a flowchart of one embodiment of a contoller placement optimization process

The general controller placement process is described in regard to FIG. 4. The input of the controller placement process is the network's topology graph G=(V, E), and the output is the controller location, i.e., the network node at which the controller will be located.

The general controller placement process is initiated by graphing the topology of the split architecture network (Block 401). The nodes and links between the nodes can be determined by administrator input, automated discovery processes or any combination thereof. The graph represents network elements (e.g., switches) in the network as nodes in a graph with the communication links between these network elements represented as links or edges in the graph.

The process then traverses the nodes in the graph to calculate a protection metric for each node in the graph (Block 403). The protection metric as described herein above and further herein below, measures resilience of the split architecture network as a degree of node failure protection for each possible controller location within the network, i.e, for each possible node or network element in the network that can host the controller. The protection metric measures resilience of the split architecture network as a degree of node failure protection within the split architecture network for a potential controller placement. The degree of node failure protection determines a subset of protected nodes (i.e., protected network elements) in the set of nodes (i.e., the set of network elements), where a protected node in the subset of protected nodes can redirect control traffic over a tunnel to an intermediate node in the graph that is not downstream of the protected node, and where the tunnel traverses at least one downstream node of the protected node.

Once the protection metric is determined for each node in the graph, the network element corresponding to the node in the graph with the best protection metric is selected (Block 405). The selected network element is then output to the network administrator for manual implementation or to a network management module for automated implementation or any combination thereof. Selection of a network element by this process provides an optimized protection strategy for the network as a whole.

There are two more specific example processes for traversing the graph and determining the protection metric for the nodes therein. In the first process—an optimal placement process—all possible locations for the controller are searched and the one that maximizes the number of protected switches is chosen. In a second process—a 'greedy' process, a faster and simpler traversal of the nodes is made with a more approximate evaluation.

Controller Placement—Optimal Placement Process

One embodiment of the process is illustrated below in Table I as psuedocode.

TABLE I

Optimal Placement Process

1. V = set of all nodes in the network; n=|V|
2. for each node v in V do
3.     T = Controller routing tree rooted at v
4.     weight(T) = 0
5.     for each node u ≠ v do
6.         weight(u) = 0
7.         If (u is not protected) then
8.             weight(u) = 1 + number of downstream nodes of u in T
9.         end
10.        weight(T) = weight(T) + weight(u);
11.     end
12. end
13. controller_location = node v with minimum weight(T)

As briefly described in the previous section, the protection metric for each node in a graphed network is based on the weight of a tree rooted at that node. The weight of the tree is calculated where each unprotected downstream node in the tree has a weight that is added to an initial value of the weight of the tree that is set to zero (line 4). For each node in the tree that is unprotected a weight is assigned that is based on the number its downstream nodes (Lines 7 and 8). The weights of each of these unprotected nodes are then accumulated to calculate the weight of the tree (line 10). After all of the tree weights are generated, then the tree with the minimum weight is selected for controller placement as it will provide the configuration with the greatest resilience due to having the least amount of unprotected nodes proximate to the controller.

Figure 5:
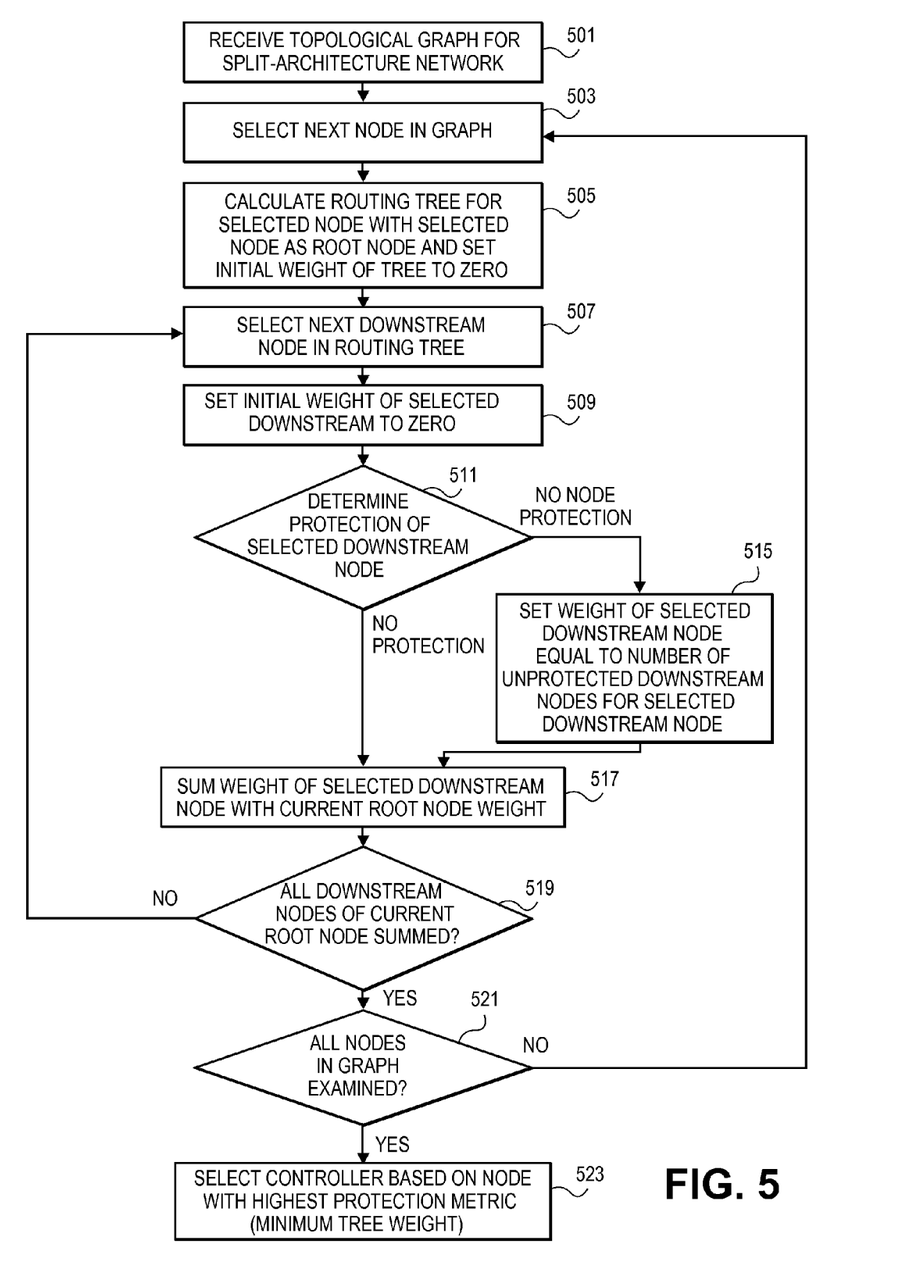
FIG. 5 is a flowchart of one embodiment of an optimal controller placement process

This process is described in relation to the flowchart of FIG. 5. The optimal placement process is initiated by the controller placement module in response to receiving a topological graph of the split architecture network from the topology graphing module (Block 501). The process then starts to iterate through each of the nodes in the graph (Block 503). The nodes can be iterated through serially or in parallel as the order of evaluation is not important as each node is to be examined and a protection metric generated for it.

For each node in the graph a controller routing tree is generated with the given node serving as the root of the tree (Block 505). The weight of this tree is given an initial value of zero. Then for each of these routing trees the nodes within these trees are traversed (Block 507). The order of traversal of the nodes within the routing trees is not important and each can be examined in parallel or serially. For each node in each routing tree an initial weight of zero is given (Block 509). A check is then made whether the currently selected node is protected as defined herein above (Block 511). If the currently selected node is not protected, then a weight for this node is calculated (Block 515). The weight can be calculated by a count of the number of nodes that are downstream from the currently selected node. This number of downstream nodes serves as the weight for the currently selected node in the calculation of the overall routing tree weight. If the currently selected node in the routing tree is protected as defined herein above, then it retains the weight of zero.

As each node weight is calculated it is summed with the weight of the current tree or the 'current root node weight' (Block 517). This summation process can be done iteratively, in which case a check is made to determine if additional nodes in the tree need to be examined (Block 519). The summation process can also be done is a parallel process or similar process.

Similarly, a check is made to determine if all the nodes in a graph have been reviewed to determine a weight of their respective controller routing tree (Block 521). This weight of the controller routing tree can be the protection metric for the corresponding root node. Once all of the protection metrics for all of the nodes in the graph have been calculated, then the node with the best protection metric (e.g., the lowest or minimum associated tree weight) can be selected to be assigned the controller (Block 523).

Controller Placement—Greedy Placement Process

If the size of the split architecture network is large, then a thorough search among all locations could become very complex. In this second process, we introduce a greedy way of finding a location with rich connections among its directly connected switches. In this process, the degree of a node v (number of its neighbors in G) is denoted by $D(v)$. The process starts by picking node $v(1)$ (line 3), the first node from an ordered list of network nodes, sorted in a decreasing degree order.

TABLE II

Greedy Placement Process

1. V = set of all nodes in the network; n=|V|;
2. Sort nodes in V such that $D(v(1)) \geq D(v(2)) \geq ... \geq D(v(n))$
3. selected-node ← v(1)
4. 
5. for i = 1 to n do
6.     A = neighbors of v(i) in V
7.     D'(v(i)) = number of members of A that are connected to at least one other member of A via a path that does not pass through v(i)
8.     if D'(v(i)) > D'(selected-node) then selected-node ← v(i)
9.     if (D'(v(i)) == D(v(i))) then break
10. end
11. controller-location ← selected-node The goal in this process is to find the node with the maximum number of protected neighbors. Here, $D'(v)$ denotes the number of protected neighbors of node v. In the ith iteration of the process, the number of protected neighbors (as defined herein above) of node v(i) are calculated (line 6), and the controller location is updated to node v(i) if it beats—in terms of the number of protected neighbors—the previously searched nodes (lines 7 and 8). The process stops when it finds the node with the maximum number of protected neighbors, which will be chosen as the node where the controller will be located at.

The protection metric used in this process is the maximum number of protected neighbors. As explained before, the nodes closer to the controller weigh more (than those further from the controller), because if their connection to the network is interrupted, all their downstream nodes will be affected and disconnected. Therefore, it is important to pick a location for the controller such that its neighbors—i.e., those switches that are directly connected to the controller, are well protected.

Figure 6:
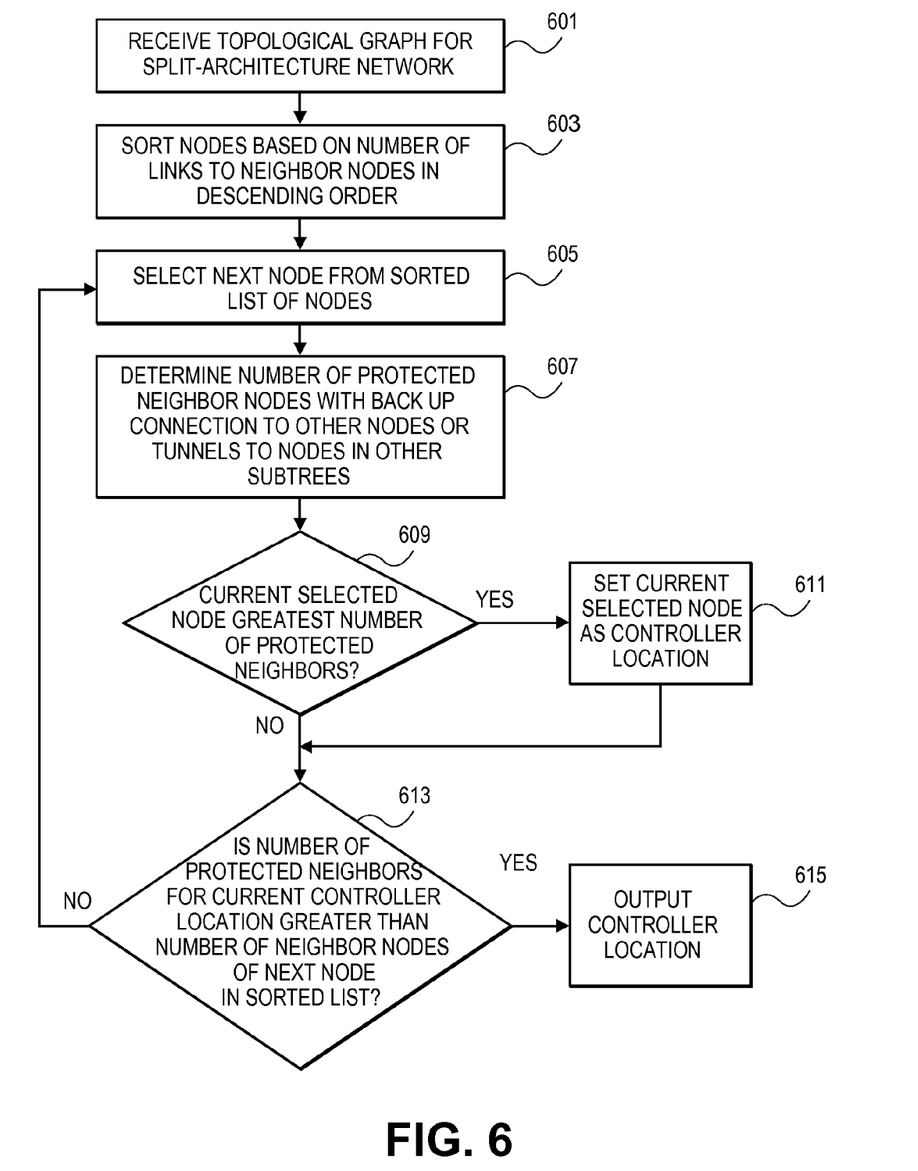
FIG. 6 is a flowchart of one embodiment of a 'greedy' controller placement process

FIG. 6 is a flowchart of one embodiment of the greedy placement process. The process can be initiated by receiving a topological graph of the split architecture network by the controller placement module (Block 601). The set of nodes are then examined to determine the number of links to neighboring nodes for each of the nodes in the graph. The nodes are then sorted based on this assessment of the number of neighbors (Block 603). Initially the node with the most neighbor links is set as the default or current location for the controller. The process then begins to iterate through each of the sorted nodes starting with the node with the highest number of neighbors and progressing through the sorted list in descending order (Block 605).

The selected node is then analyzed to determine the number of the links to neighbors that are protected (Block 607). A check is then made to compare this node's number of protected links to the number of protected links of the node set as or initially selected as the current location (Block 609). If the node being analyzed exceeds the current location node then, the current location node is updated (Block 611). The process continues by checking if the number of protected nodes of the current location node is less than the number of neighbors for the next node to be examined (Block 613). If the number of protected nodes exceeds the next node in the sorted list's number of neighbors, then the process can complete and output the current selected node to be used as the controller placement location (Block 615). Otherwise, the process continues to the next node in the sorted list.

Network resilience is one of the most important factors in evaluating any network designs. A failure of a few milliseconds may easily result in terabyte data losses on the links of high speed transmission rates. From the practical deployment's perspective, these processes for optimized controller location maximize the resilience between controller and the switches in the split architecture. These processes maximize network's resilience by maximizing the number of switches that are protected with preconfigured backup paths or tunnel-based protection that are in proximity to the controller. In case of failures, the affected forwarding elements could immediately switch over to their back up paths or tunnel-based routes and restore their connections with the controller.

The embodiments of the invention can provide guidelines for the operators to deploy their network in a cost-effective manner. They can improve the resilience of the split architecture network, which can prevent hundreds of thousands of flows being affected by transient failures.

Use of Split Architecture Networks

A split-architecture network can be deployed for cellular backhaul to support MPLS based forwarding. In LTE, it can be also deployed in the mobile core to route the user traffic between the MME, Serving-GW and PDN-GW. In this case, the controller can be implemented in multiple sites or multiple locations in one site. The processes in this invention can be used to calculate the best location for controller placement.

When multiple technologies co-exist, e.g. GSM, 3G, LTE, they may share the same packet transport networks. In this example, a common set of controllers can be used to control packet switching functions for all networks together. This invention can be used to determine the location of controller for controlling multiple technology networks.

In cloud computing, especially data center networks, to reduce the cost of networking infrastructure, split architecture with a smart controller and a set of low-cost switches is preferred. In the data center network environment, the controller placement process can be applied to deploy controllers.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network topology design system including a processing device, the method comprising the steps of:

graphing, by the processing device, a topology of a network with a split architecture as a graph G=(V, E), wherein the split architecture network contains control plane components and data plane components, where the control plane components of the split architecture network are executed by a controller and the control plane components are separate from the data plane components of the split architecture network, with links in the split architecture network represented as a set of bidirectional edges (E) in the graph and network elements in the split architecture network represented as a set of nodes (V) in the graph;

traversing, by the processing device, the set of nodes within the graph to calculate a protection metric for each node, wherein the protection metric measures resilience of the split architecture network as a degree of node failure protection within the split architecture network for a potential controller placement, the degree of node failure protection based on determining a subset of protected nodes in the set of nodes, where a protected node in the subset of protected nodes is capable of redirecting control traffic over a tunnel to an intermediate node in the graph that is not downstream of the protected node, and where the tunnel traverses at least one downstream node of the protected node, the tunnel for carrying encapsulated control traffic to the intermediate node that is to be de-capsulated by the intermediate node and forwarded to the controller by the intermediate node; and selecting, by the processing device, a network element corresponding to a node with a best protection metric to be the controller for the split architecture network to minimize disruption of the split architecture network caused by a link failure, a switch failure or a connectivity loss between the controller and the data plane components.

2. The method of claim 1, wherein traversing the set of nodes to calculate the protection metric further comprises the step of:

calculating a routing tree for each node in the set of nodes with each node at a root of a corresponding routing tree.

3. The method of claim 2, wherein traversing the set of nodes to calculate the protection metric further comprises the step of:

determining the routing tree weight based on a number of unprotected downstream nodes in the routing tree.

4. The method of claim 3, wherein traversing the set of nodes to calculate the protection metric further comprises the step of:

summing all node weights in each routing tree to obtain the protection metric for each corresponding node in the split architecture network.

5. The method of claim 3, wherein selecting the network element corresponding to the node with a best protection metric to be the controller for the split architecture network further comprises the step of:

selecting a node with a minimum weight for a corresponding routing tree amongst all weights for all routing trees corresponding to the set of nodes in the split architecture network.

6. The method of claim 5, wherein traversing the set of nodes to calculate the protection metric further comprises the step of:

sorting the set of nodes in descending order based on a number of links to neighbor nodes for each node.

7. The method of claim 6, wherein traversing the set of nodes to calculate the protection metric further comprises the step of:

determining a number of protected neighbor nodes with a connection to other nodes.

8. The method of claim 7, wherein selecting the network element corresponding to the node with a best protection metric to be the controller for the split architecture network comprises the step of:

selecting a node with a largest number of protected neighbor nodes to be the controller.

9. A computer system for determining a placement of a controller for a split architecture network, the computer system comprising:

a processor configured to execute a topology graphing module and controller placement module, the topology graphing module configured to graph a topology of a network with a split architecture as a graph G=(V, E), wherein the split architecture network contains control plane components and data plane components, where the control plane components of the split architecture network are executed by the controller and the control plane components are separate from the data plane components of the split architecture network, with links in the split architecture network represented as a set of bidirectional edges (E) in the graph and network elements in the split architecture network represented as a set of nodes (V) in the graph, the controller placement module configured to traverse the set of nodes within the graph to calculate a protection metric for each node, wherein the protection metric measures resilience of the split architecture network as a degree of node failure protection within the split architecture network for a potential controller placement, the degree of node failure protection based on determining a subset of protected nodes in the set of nodes, where a protected node in the subset of protected nodes is capable of redirecting control traffic over a tunnel to an intermediate node in the graph that is not downstream of the protected node, and where the tunnel traverses at least one downstream node of the protected node, the tunnel for carrying encapsulated control traffic to the intermediate node that is to be de-capsulated by the intermediate node and forwarded to the controller by the intermediate node, the controller placement module further configured to select a network element corresponding to a node with a best protection metric to be the controller for the split architecture network to minimize disruption of the split architecture network caused by a link failure, a switch failure or a connectivity loss between the controller and the data plane components.

10. The computer system of claim 9, wherein the controller placement module is further configured to calculate a routing tree for each node in the set of nodes with each node at a root of a corresponding routing tree.

11. The computer system of claim 10, wherein the controller placement module is further configured to determine the routing tree weight based on a number of unprotected downstream nodes in the routing tree.

12. The computer system of claim 11, wherein the controller placement module is further configured to sum all node weights in each routing tree to obtain the protection metric for each corresponding node in the split architecture network.

13. The computer system of claim 11, wherein the controller placement module is further configured to select a node with a minimum weight for a corresponding routing tree amongst all weights for all routing trees corresponding to the set of nodes in the split architecture network.

14. The computer system of claim 13, wherein the controller placement module is further configured to sort the set of nodes in descending order based on a number of links to neighbor nodes for each node.

15. The computer system of claim 14, wherein the controller placement module is further configured to determine a number of protected neighbor nodes with a connection to other nodes.

16. The computer system of claim 15, wherein the controller placement module is further configured to select a node with a largest number of protected neighbor nodes to be the controller.

* * * * *

UNITED STATES PATENT AND TRADEMARK OFFICE
CERTIFICATE OF CORRECTION

PATENT NO. : 9,225,591 B2  Page 1 of 1
APPLICATION NO. : 14/637238
DATED : December 29, 2015
INVENTOR(S) : Beheshti-Zavareh et al.

It is certified that error appears in the above-identified patent and that said Letters Patent is hereby corrected as shown below:

Specification

In Column 11, Line 24, delete "link" and insert -- link. --, therefor.

Signed and Sealed this
Nineteenth Day of April, 2016

Michelle K. Lee
*Director of the United States Patent and Trademark Office*